(12) United States Patent
Darbari

(10) Patent No.: US 9,519,611 B2
(45) Date of Patent: Dec. 13, 2016

(54) HARDWARE DATA STRUCTURE FOR TRACKING ORDERED TRANSACTIONS

(71) Applicant: Imagination Technologies Limited, Kings Langley (GB)

(72) Inventor: Ashish Darbari, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/832,087

(22) Filed: Aug. 21, 2015

(65) Prior Publication Data

US 2016/0062941 A1    Mar. 3, 2016

(30) Foreign Application Priority Data

Sep. 2, 2014 (GB) .................................. 1415518.8

(51) Int. Cl.
| | |
|---|---|
| *G06F 11/00* | (2006.01) |
| *G06F 13/42* | (2006.01) |
| *G06F 13/36* | (2006.01) |
| *G06F 11/28* | (2006.01) |
| *G06F 5/00* | (2006.01) |
| *G06F 11/30* | (2006.01) |
| *G06F 11/07* | (2006.01) |

(52) U.S. Cl.
CPC ............. *G06F 13/4221* (2013.01); *G06F 5/00* (2013.01); *G06F 11/079* (2013.01); *G06F 11/0745* (2013.01); *G06F 11/28* (2013.01); *G06F 11/30* (2013.01); *G06F 13/36* (2013.01)

(58) Field of Classification Search
USPC .......................................................... 714/51
See application file for complete search history.

(56) References Cited

U.S. PATENT DOCUMENTS

| | | | |
|---|---|---|---|
| 7,124,110 B1 * | 10/2006 | Kemp, II | ............... G06Q 40/04 705/37 |
| 7,552,073 B1 * | 6/2009 | Brumfield | .............. G06Q 40/00 705/35 |
| 7,555,634 B1 | 6/2009 | Thatipelli et al. | |
| 8,938,636 B1 | 1/2015 | Hochschild et al. | |
| 2005/0193039 A1 * | 9/2005 | Adiba | ............... G06F 17/30312 |
| 2012/0123915 A1 * | 5/2012 | Risnoveanu | ........... G06Q 20/10 705/30 |
| 2013/0159591 A1 | 6/2013 | Acuna et al. | |

* cited by examiner

*Primary Examiner* — Sarai Butler
(74) *Attorney, Agent, or Firm* — Vorys, Sater, Seymour and Pease LLP; Vincent M DeLuca

(57) ABSTRACT

Methods and hardware data structures are provided for tracking ordered transactions in a multi-transactional hardware design using a counter and an indexed table. The data structure includes a counter that keeps track of the number of in-flight transactions; a table that keeps track of the age of each of the in-flight transactions using the counter; and control logic that verifies a transaction response has been received in the correct order (e.g. corresponds to the oldest in-flight transaction) based on the age information in the table.

20 Claims, 15 Drawing Sheets

HARDWARE DATA STRUCTURE FOR TRACKING ORDERED TRANSACTIONS

BACKGROUND

Many hardware designs, such as bus protocols, coherent fabrics, memory sub-systems, and arithmetic datapaths, can have multiple (sometimes hundreds or thousands of) transactions "in-flight" at any point in time. A transaction is an exchange or interaction of data between start and end points of the design. Typically a transaction originates from a master (e.g. the requestor) and is sent to a slave for processing. For example, a master may send a request to read from, or write to, a memory or a cache (slave). A transaction is "in-flight" if it has been accepted for processing at an input interface of the slave and has not been issued out on an output interface of the slave. Accordingly, when a transaction first appears on an input interface of the slave it becomes in-flight and it remains in-flight until the transaction is issued out on an output interface of the slave. Such hardware designs are referred to as multi-transactional hardware designs.

Often multiple in-flight transactions need to access the same resource, such as a cache, arbiter, memory etc. which can create hazards. A hazard is a condition that occurs when more than one transaction (originating from the same or different requestors) tries to gain access to a shared resource (e.g. memory) at the same time. For example, if there is a write transaction and a read transaction to the same memory address, if the write is issued before the read, then the expected behavior is that the write should be completed before the read so that the read will get the new value written by the write. If, however, the read is completed before the write then the read will get the old value instead of the new value resulting in a hazard.

To eliminate hazards the hardware may be designed to implement an ordering on the transactions. This typically involves assigning to the transactions a unique identifier and using a hardware data structure to track the transactions and enforce an order using the unique identifiers. For example, the hardware data structure may ensure that when transaction requests (e.g. read/write requests) are issued on an interface that the corresponding responses (e.g. data payloads) come back in the same order in which the transaction requests were issued.

The most commonly used hardware data structure for tracking ordered transactions is a FIFO (First In First Out) data structure which uses a two-dimensional array and multiple pointers (e.g. a read pointer and a write pointer) to keep track of data in the array. However, formal verification using a FIFO to track ordered transactions is difficult.

The embodiments described below are provided by way of example only and are not limiting of implementations which solve any or all of the disadvantages of known data structures for tracking ordered transactions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments described herein relate to methods and hardware data structures for tracking ordered transactions in a multi-transactional hardware design using a counter and an indexed table. In some examples, the data structure comprises a counter that keeps track of the number of in-flight transactions; a table that keeps track of the age of each of the in-flight transactions using the counter; and control logic that verifies that a transaction response has been received in the correct order (e.g. corresponds to the oldest in-flight transaction) based on the age information in the table.

A first aspect provides a hardware data structure to track a plurality of ordered transactions in a multi-transactional hardware design, the hardware data structure comprising: a counter configured to store a value that tracks a number of in-flight transactions in the hardware design; a table configured to track an age of each of the in-flight transactions using the counter; and control logic configured to verify a transaction response issued by the hardware design has been issued in a predetermined order based on the tracked ages of the in-flight transactions in the table.

A second aspect provides a method of tracking a plurality of ordered transactions in a multi-transactional hardware design, the method comprising: tracking a number of in-flight transactions in the hardware design using a counter; tracking an age of each of the in-flight transactions in a table using the counter; and verifying that a transaction response issued by the hardware design has been issued in a predetermined order based on the tracked ages of the in-flight transactions in the table.

A third aspect provides a computer readable storage medium having encoded thereon computer readable program code for generating the hardware data structure of the first aspect.

A fourth aspect provides a computer readable storage medium having encoded thereon computer readable program code for generating a hardware data structure configured to perform the method of the second aspect.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
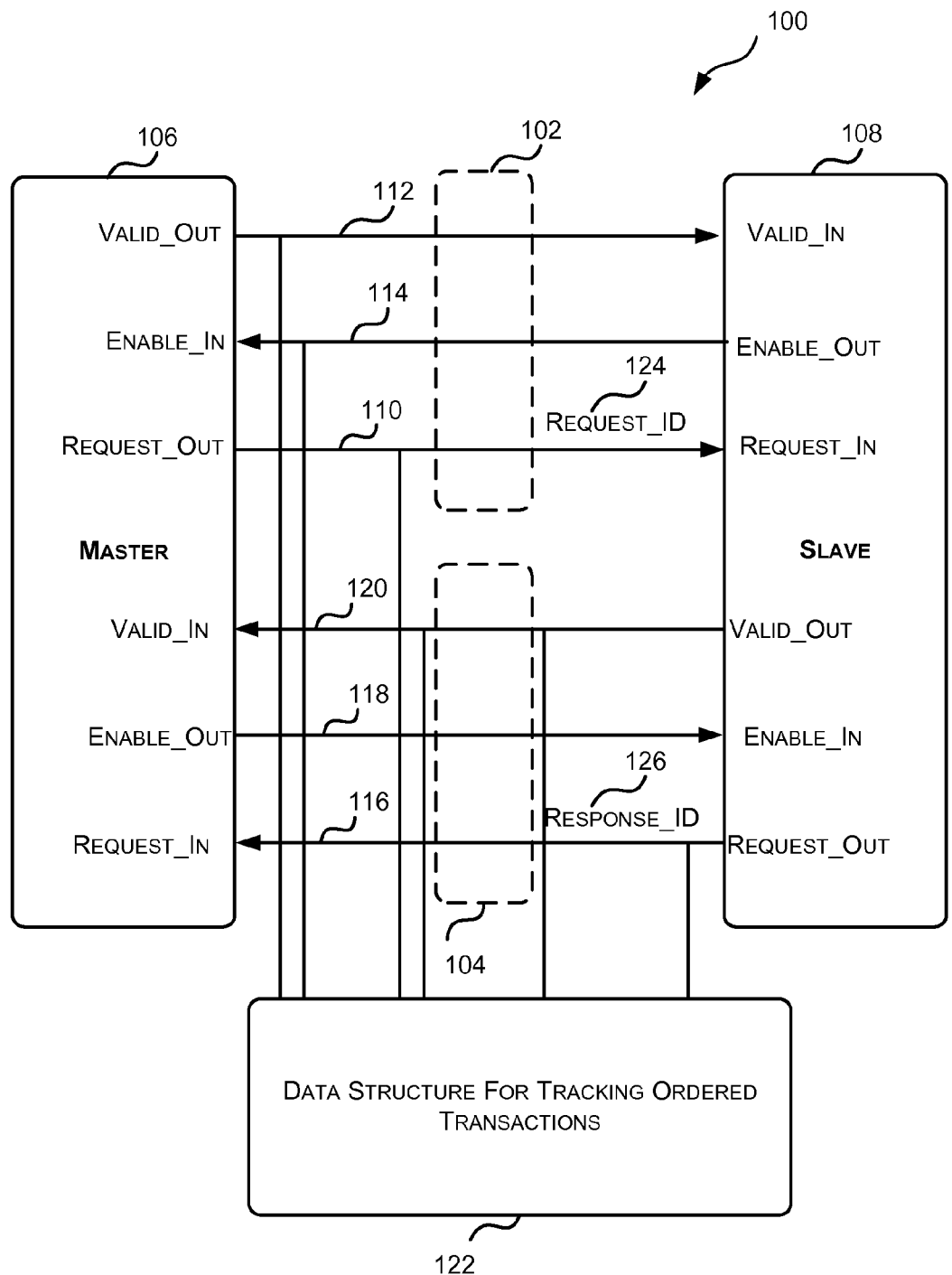
FIG. 1 is a block diagram of an example multi-transactional hardware design.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Embodiments described herein relate to methods and hardware data structures for tracking ordered transactions in a multi-transactional hardware design using a counter and an indexed table. In some examples, the data structure comprises a counter that keeps track of the number of in-flight transactions; a table that keeps track of the age of each of the in-flight transactions using the counter; and control logic that verifies a transaction response has been received in the correct order based on the age information in the table. In one example, the control logic verifies the transaction response has been received in the correct order if the table indicates that the transaction is the oldest in-flight transaction.

The term "hardware design" is used herein to refer to an analog or digital implementation of a specification (e.g. user specified functionality) for an electronic device (e.g. a processor) that is ultimately synthesized into silicon. The term "hardware data structure" is used herein to refer to a structure that interacts with a hardware design to store, organize, and track data related to the hardware design. The hardware data structure may be used as a design component or a verification component. Where the hardware data structure is used as a design component the hardware data structure implements certain desired functionality which is ultimately synthesized into silicon. Where the hardware data structure is used as a verification component it allows an aspect of the hardware design to be verified through formal or simulation-based verification.

As described above, many hardware designs, such as bus protocols, coherent fabrics, memory sub-systems, and arithmetic datapaths, are multi-transactional meaning they can have multiple (sometimes hundreds or thousands of) transactions in-flight at any point in time. A transaction is an exchange or interaction of data between start and end points of the design. Typically a transaction originates from a master (e.g. the requestor) and is sent to a slave for processing. For example, a master may send a request to read from, or write to, a memory or a cache (slave). A transaction is "in-flight" if it has been accepted for processing at an input interface of the slave and has not been issued out on an output interface of the slave. Accordingly, when a transaction first appears on an input interface of the slave it becomes "in-flight" and it remains "in-flight" until the transaction is issued out on an output interface of the slave.

Often multiple in-flight transactions need to access the same resource, such as a cache, arbiter, memory etc. which can create hazards. A hazard is a condition that occurs when more than one transaction (originating from the same or different requestors) tries to gain access to a shared resource (e.g. memory) at the same time. For example, if there is a write transaction and a read transaction to the same memory address, if the write is issued before the read, then the expected behavior is that the write should be completed before the read so that the read will get the new value written by the write. If, however, the read is completed before the write then the read will get the old value instead of the new value resulting in a hazard.

To eliminate hazards the hardware may be designed to implement an ordering on the transactions. This typically involves assigning to the transactions a unique identifier and using a hardware data structure to track the transactions and enforce an order using the unique identifiers. For example, the hardware data structure may ensure that when transaction requests (e.g. read/write requests) are issued on an interface that the corresponding responses (e.g. data payloads) come back in the same order in which the transaction requests were issued.

This is illustrated in FIG. 1 which shows an example multi-transactional system 100 where transaction request messages 102 and transaction response messages 104 are sent between a master 106 and a slave 108. The master 106 first notifies the slave 108 that it is ready to send a request by sending a Valid_Out signal 112, which is interpreted by the slave 108 as a Valid_In signal. The slave 108 then sends an Enable_Out signal to the master 106, which is interpreted by the master 106 as an Enable_In signal 114 indicating that the slave 108 is ready to receive the request. The master 106 then sends a transaction request 110 to slave 108 via an output interface. Similarly the master 106 receives a transaction response 116 via an input interface after the master 106 has sent an Enable_Out signal 118 to the slave 108 indicating it is ready to receive the transaction response 116; and the master 106 has received a Valid_In signal 120 from the slave indicating the slave 108 is ready to send the response.

If it is desirable that the transaction responses are issued by the slave 108 in the same order in which the corresponding transaction requests were issued by the master 106 then the transactions may be assigned a unique identifier (e.g. a transaction ID) and a data structure 122 may be implemented to monitor the order of the transaction requests and responses using the identifiers to ensure they match. The transaction ID of the transaction request will be referred to herein as the Request_ID 124 and the transaction ID of a transaction response will be referred to herein as the Response_ID 126. The master 106 is configured to include the Request_ID 124 in the transaction request 110 and the slave 108 is configured to include the Response_ID 126 in the transaction response 116.

Figure 2:
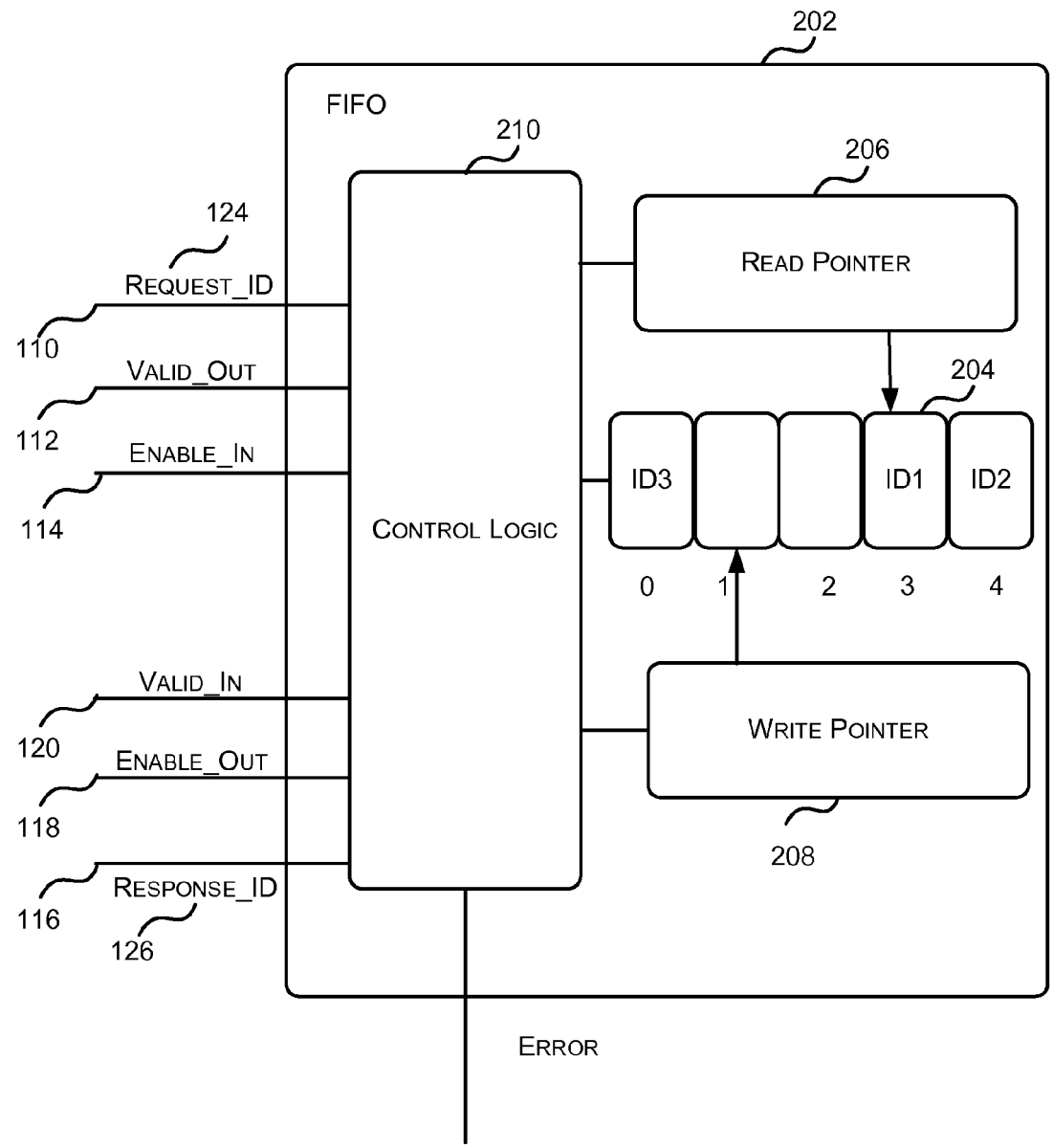
FIG. 2 is a block diagram of an example FIFO data structure for tracking ordered transactions.

The most commonly used hardware data structure for tracking ordered transactions is a FIFO (First In First Out) data structure. Reference is now made to FIG. 2 which illustrates an example FIFO 202 for tracking ordered transactions. The FIFO 202 comprises an indexed array 204 for keeping track of the transaction IDs of the in-flight transactions; a read pointer 206 which points to the index containing the transaction ID corresponding to the oldest in-flight transaction (i.e. the in-flight transaction that was issued the earliest); a write pointer 208 which points to the next free or empty index of the array 204; and control logic 210 for controlling the array 204, read pointer 206 and write pointer 208.

Figure 3:
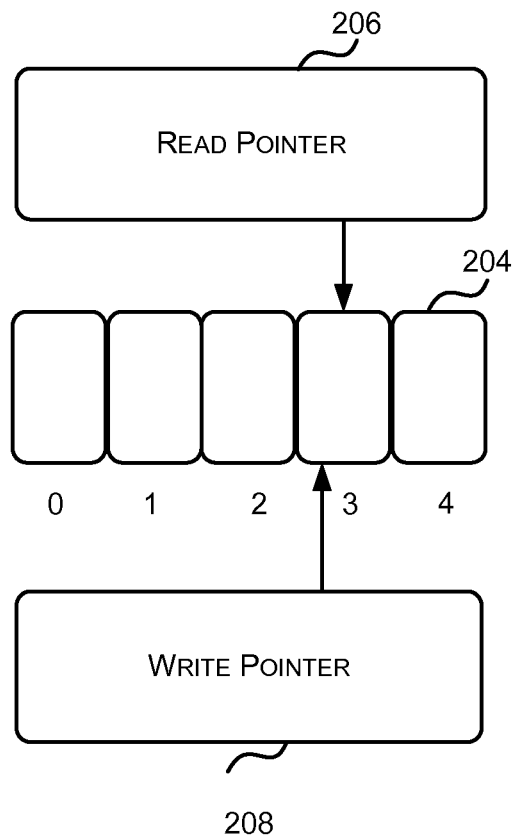
FIG. 3 is a block diagram of the FIFO of FIG. 2 when it is empty.

When the read pointer 206 and the write pointer 208 point to the same index of the array 204 (as shown for example in FIG. 3) the array 204 may be empty or full. If the write pointer 208 is adjusted to equal the read pointer 206 (e.g. the write pointer 208 is incremented to match the read pointer 206) then the array 204 is full. If, however, the read pointer 206 is adjusted to equal the write pointer 208 (e.g. the read pointer 206 is decremented to point to the write pointer 208) the array 204 is empty.

When the control logic 210 detects that a transaction request has been issued by the master 106 (e.g. when the Valid_Out 112 and Enable_In 114 signals are high) the control logic 210 writes the transaction ID of the transaction request (e.g. Request_ID 124) to the array index pointed to by the write pointer 208. The control logic 210 then increments the write pointer 208 to point to the next index in the array 204.

Figure 4:
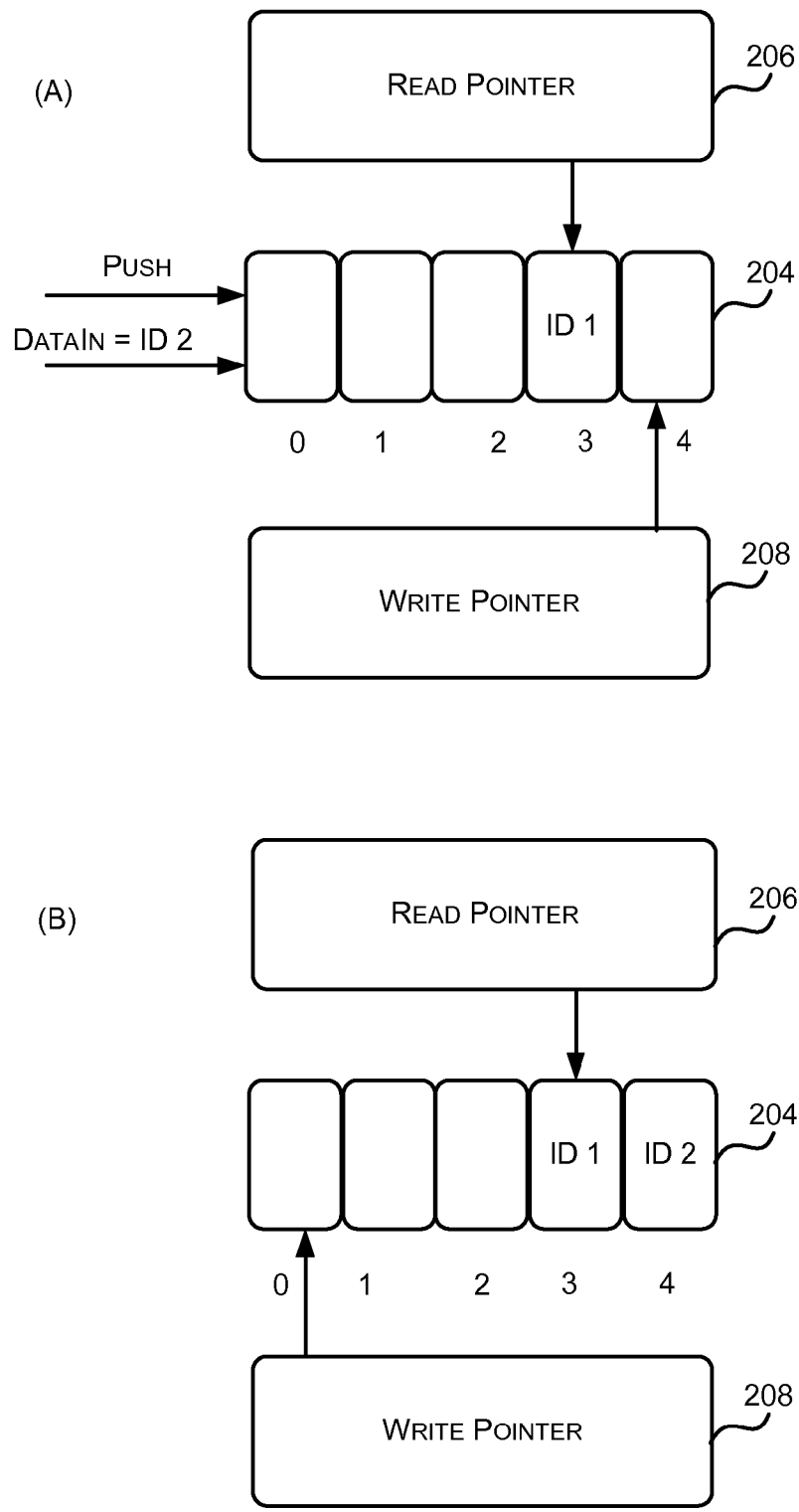
FIG. 4 is a set of bock diagrams of the FIFO of FIG. 2 illustrating adding a transaction ID to the FIFO after a transaction request has been issued.

This is illustrated in FIG. 4. In particular as illustrated at (A) an array 204 comprises one transaction ID (e.g. ID 1) at index three of the array 204 so the read pointer 206 points to the third index and the write pointer 208 points to the next index (e.g. index four) of the array. When the control logic 210 detects that a transaction request has been issued by the master 106 the control logic 210 sends the Request_ID 124 (e.g. ID 2) to the array 204 with a push command (e.g. the push signal is set high). As shown at (B) in FIG. 4 this causes the Request_ID (e.g. ID 2) to be written to the index pointed to by the write pointer 208 (e.g. index four); and the write pointer 208 to be incremented to point the next index (e.g. index zero) of the array 204.

When the control logic 210 detects that a transaction response has been issued by the slave 108 (e.g. when the Valid_In 120 and Enable_Out 118 signals (from the perspective of the master) are high) the control logic 210 obtains the oldest transaction ID in the array (e.g. the transaction ID at the index pointed to by the read pointer 206) and increments the read pointer to point to the next index of the array (e.g. the index where the transaction ID corresponding to the next oldest transaction is stored). The control logic 210 then compares the oldest transaction ID in the array with the transaction ID of the response (e.g. Response_ID 126) to determine if the response has been issued in the correct order. Specifically, if the response does not correspond to the oldest in-flight transaction then the response received from the slave has been sent before the response of the oldest in-flight transaction and there is an error.

Figure 5:
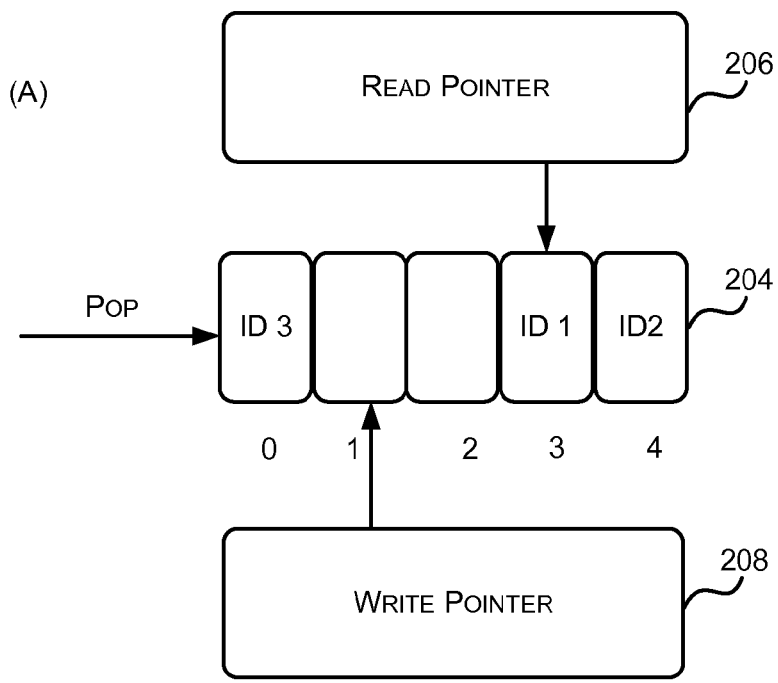
FIG. 5 is a set of bock diagrams of the FIFO of FIG. 2 illustrating removing a transaction ID from the FIFO after a transaction response has been received.
Figure 5:
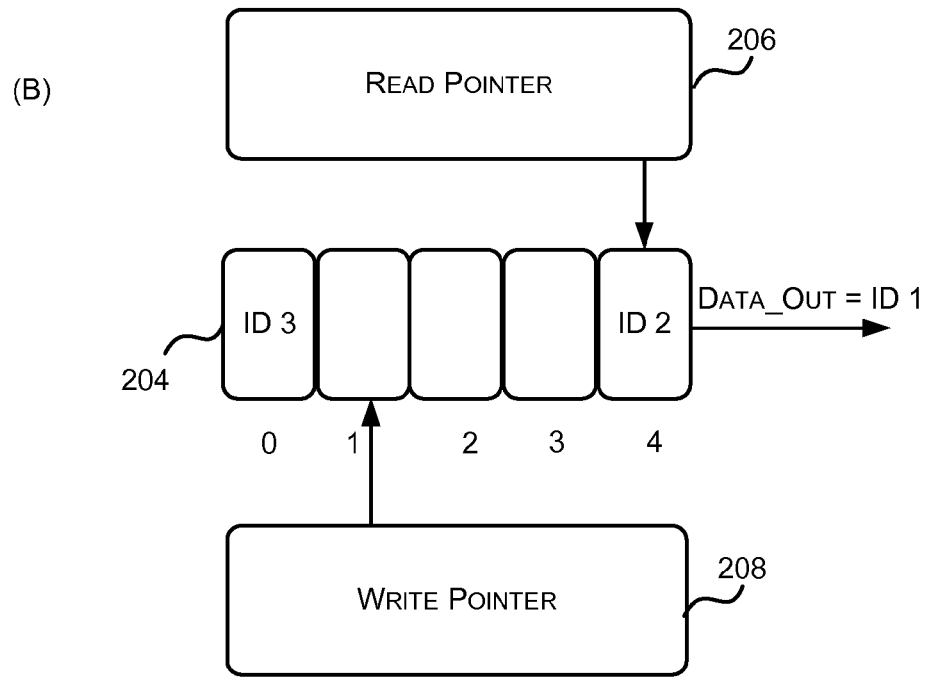

This is illustrated in FIG. 5. In particular as illustrated at (A) in FIG. 5 an array 204 comprises three transaction IDs (e.g. ID 1, ID 2 and ID 3) at indexes three, four and zero respectively. The read pointer 206 points to index three indicating that ID 1 is the ID corresponding to the oldest in-flight transaction. When the control logic 210 detects that a response has been issued by the slave 108 the control logic 210 sends a pop command (e.g. the pop signal is set high) to the array 204. As shown at (B) in FIG. 5 this causes the array to output the ID at the index pointed to by the read pointer 206 (e.g. ID 1 at index three) and to increment the read pointer 206 to point to the next index of the array (e.g. index four) which is the ID for the next oldest in-flight transaction. The control logic 210 then compares the output data (e.g. ID 1) to the Response_ID 126 to see if they match.

The number of state-bits (or flip-flops) required to implement the FIFO 202 is equal to the sum of the number of bits required for the array 204, the number of bits required for the read pointer, and the number of bits required for the write pointer 208. The array 204 is defined by the number of IDs that it can store (e.g. the number of indexes it has) which should be equal to or greater than the maximum number of transactions that can be in-flight at any one time (e.g. MAX_TRANSACTIONS), and the number of bits required to store each ID (e.g. ID_WIDTH). Therefore the total number of bits required for the array 204 is MAX_TRANSACTIONS*ID_WIDTH. The read and write pointers 206 and 208 are used to hold an index to the array 204 so if the array has MAX_TRANSACTIONS indexes, the pointers require $\log_2(\text{MAX\_TRANSACTIONS})$ bits. Accordingly, the total number of bits to implement the FIFO can be represented by formula (1):

$$(\text{MAX\_TRANSACTIONS} * \text{ID\_WIDTH}) + (2 * \log_2(\text{MAX\_TRANSACTIONS})) \qquad (1)$$

Accordingly, where MAX_TRANSACTIONS is 1024 and the ID_WIDTH is 10, the number of state-bits (or flip-flops) required to implement the FIFO 202 is 10260. While this produces a relatively efficient data structure for tracking ordered transactions in terms of the area footprint required, such a structure can make verification difficult, particularly formal verification.

In particular, hardware designs are typically verified (e.g. determined to meet their specification) before they are implemented in silicon because discovering an error post-silicon can be very expensive to fix. A design may be verified through simulation based verification or formal verification. Simulation based verification requires the generation of input stimuli which is time consuming, not easily adaptable and does not provide an exhaustive answer as to whether the design meets the specification (i.e. it is limited by the input stimuli). In contrast, formal verification involves defining the properties to be verified mathematically and analyzing the state space of the design implementation to determine if the properties are satisfied. This allows verification to be done without generating input stimuli. It also allows the design behavior to be proved or disproved for all possible states.

Accordingly, formal verification provides certain advantages over simulation-based verification; however, the sequential nature of pointer increments means that the data in the array of a FIFO can only be accessed sequentially making state-space search extremely difficult because it consumes more time and memory to perform an exhaustive search. This is because the structure of the FIFO 202 means that only one location (the one pointed to by the write pointer or read pointer respectively) can be read from or written to causing formal verification to progress much more slowly. This prevents formal verification tools from giving a determined answer giving an impression that the formal verification is not scaling. This makes formal verification using a FIFO 202 data structure to track ordered transactions (and the ordering enforced thereby) an intractable task.

To address this problem, described herein is a new data structure for tracking ordered transactions in a multi-transactional design using a counter and an indexed table. In particular, the use of an indexed table allows access to any entry in the table at any time, as opposed to the two-dimensional array of a FIFO 202 which only allows access to the data pointed to by the pointers. Accordingly the data structure described herein eliminates the formal verification issues related to the sequential nature of pointers.

Figure 6:
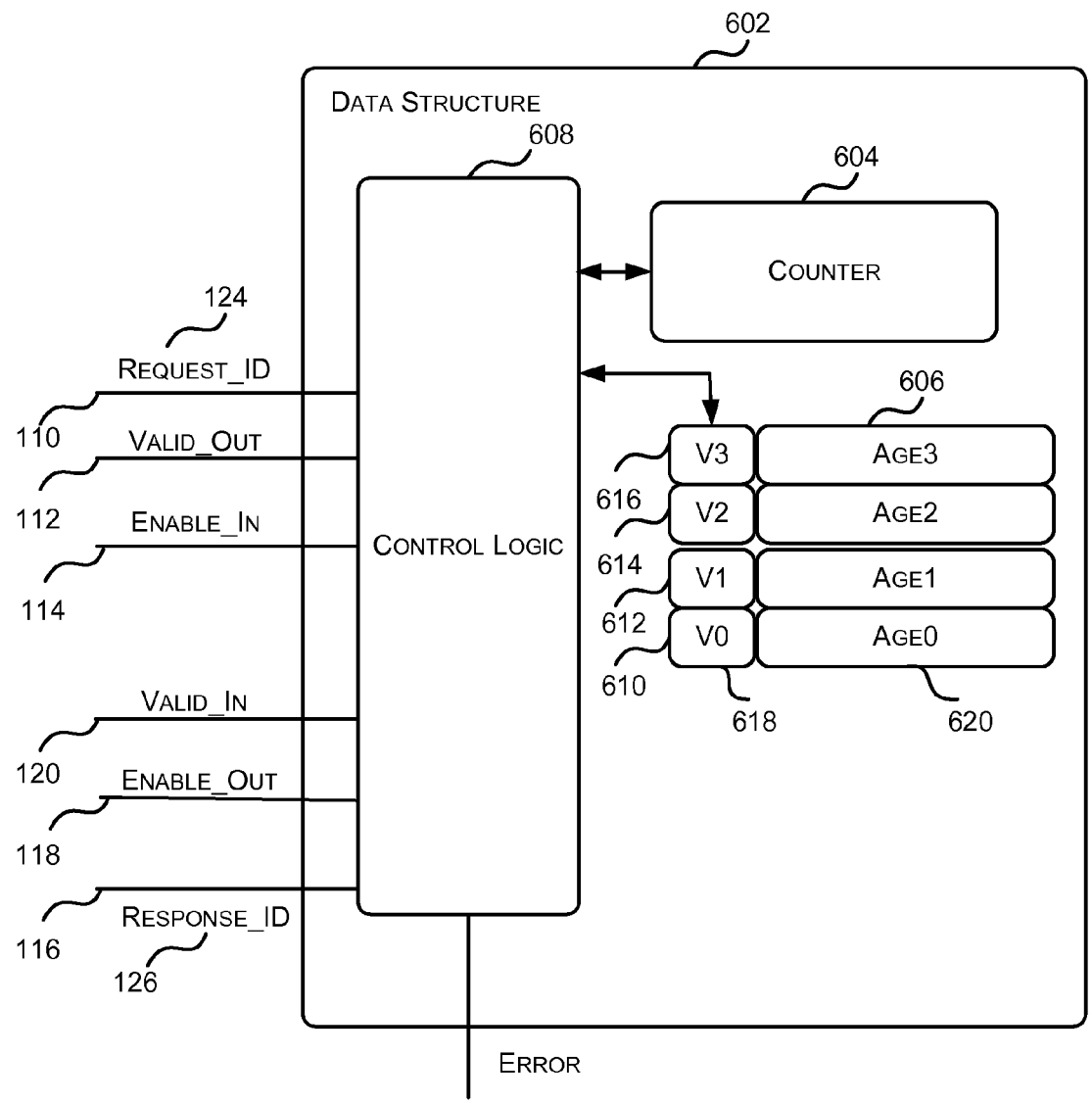
FIG. 6 is a block diagram of an example new data structure for tracking ordered transactions using a counter and a table.

Reference is now made to FIG. 6 which illustrates an example of the new data structure 602 which may be used as the data structure 122 in FIG. 1. The new data structure 602 comprises a counter 604 for keeping track of the number of in-flight transactions; an indexed table 606 for keeping track of the relative age of each flight transaction (e.g. ordering the in-flight transactions based on which was issued most recently); and control logic 608 for controlling the counter 604 and the indexed table 606.

The counter 604 keeps a running count of the number of transactions that are in-flight (e.g. transaction requests that have been issued, but no response has been issued). In some cases, the counter 604 is incremented each time a transaction request is issued by the master and is decremented each time a transaction response is issued by the slave. In some cases the counter 604 has the ability to count up to the maximum number of transactions (MAX_TRANSACTIONS) that can be in-flight at any one time. For example, if a maximum of ten transactions can be in-flight at any one time then the counter should be able to count to at least ten. Accordingly, in these cases the counter requires at least $\log_2(\text{MAX\_TRANSACTIONS})+1$ bits.

The indexed table 606 keeps track of the order in which the in-flight transaction requests were issued (e.g. the age of the in-flight transactions). In some cases, the table 606 comprises a plurality of rows 610, 612, 614 and 616 and columns 618, 620. Each row comprises tracking information for a particular transaction ID. For example, where the transaction ID is two bits, the first row 610 corresponds to transaction ID "00" (0), the second row 612 corresponds to transaction ID "01" (1), the third row 614 corresponds to transaction ID "10" (2), and the fourth row 616 corresponds to transaction ID "11" (3). Accordingly, the transaction ID can be used as the index to the table. Note that the binary representation of a number is shown herein in quotes (e.g. "11") and the corresponding decimal representation of the number is shown herein in brackets after the binary representation.

Each column 618 and 620 provides information on the in-flight status of the transaction with the corresponding transaction ID. In one example, the table comprises two columns 618 and 620. The first column 618 comprises a valid bit indicating whether a transaction with the corresponding transaction ID is currently in-flight (e.g. request issued by the master, but no response issued by the slave). The second column 620 comprises an age value indicating the order of the in-flight transaction with respect to the other in-flight transactions (e.g. the age of the in-flight transaction). In particular, the age value indicates which in-flight transaction is the oldest in-flight transaction and which in-flight transaction is the youngest in-flight transaction. For example, in some cases the higher the age value the newer the in-flight transaction (e.g. the more recently the transaction request was issued) and the lower the age value the older the in-flight transaction (e.g. the more time has passed since the transaction request was issued).

In some cases the valid bits are initially (e.g. upon a reset) cleared (e.g. set to a zero value) to indicate that transactions with the corresponding transaction IDs are not currently in-flight, however, the age values are not initially (e.g. upon a reset) set to any known value and thus after a reset they may have any value (this is denoted by an "X").

In another example, the table may comprise only a single column comprising an age value indicating the order of the in-flight transaction with respect to the other in-flight transaction. In this example the age value itself may also indicate whether the transaction is currently in-flight (e.g. a zero age value may indicate a transaction is not in-flight and a non-zero age value may indicate the transaction is in-flight). In these examples the age values are initially (e.g. upon a reset) set to a known value (e.g. to zero) to indicate that a transaction with the corresponding transaction ID is not currently in-flight.

In some cases, the counter 604 value is written to the appropriate row of the table 606 when a transaction request is issued. Each time a response is received all of the age values for in-flight transactions are decremented except the age value corresponding to the received response. Instead, the entry for the received response is updated to indicate that the transaction is no longer in-flight (i.e. that a response has been issued). In some cases (e.g. where the table has a valid bit), the entry for the received response is updated by resetting the valid bit (e.g. to zero) to indicate the transaction is no longer in-flight. In other cases (e.g. where the table does not have a valid bit), the entry for the received response is updated by setting the age value to a known value (e.g. to zero) to indicate the transaction is no longer in-flight. In this manner the oldest in-flight transaction in the table will have the lowest age value of the in-flight transactions (e.g. zero or one depending on whether a valid bit is used).

Since the table has an entry for each possible transaction ID, if each transaction ID has ID_WIDTH bits, then the number of rows in the table 606 will be equal or greater than $2^{ID\_WIDTH}$. Where the table 606 has the two columns 618 and 620 described above then each row will require 1 bit for the valid bit 618 and Y bits for the age value 620 where Y is the number of bits used for the counter 604. Where the counter 604 is $\log_2(\text{MAX\_TRANSACTIONS})+1$ bits wide (as described above) then each row will require $1+\log_2(\text{MAX\_TRANSACTIONS})+1$ bits. Accordingly, the total number of bits for the table will be as shown in equation (2):

$$2^{ID\_WIDTH}*(1+\log_2(\text{MAX\_TRANSACTIONS})+1) \qquad (2)$$

Accordingly, where MAX_TRANSACTIONS is 1024 and the ID_WIDTH is 10, the minimum number of bits (or flip-flops) to implement the data structure 602 is 12299. While this is an increase over the number of bits to implement the FIFO 202 of FIG. 2, it is a much more efficient data structure for formal verification.

The control logic 608 is configured to: (1) detect when transaction requests and responses are issued and update the counter 604 and table 606 accordingly; and (2) detect when responses are issued out of order and output an error or other notification.

Figure 7:
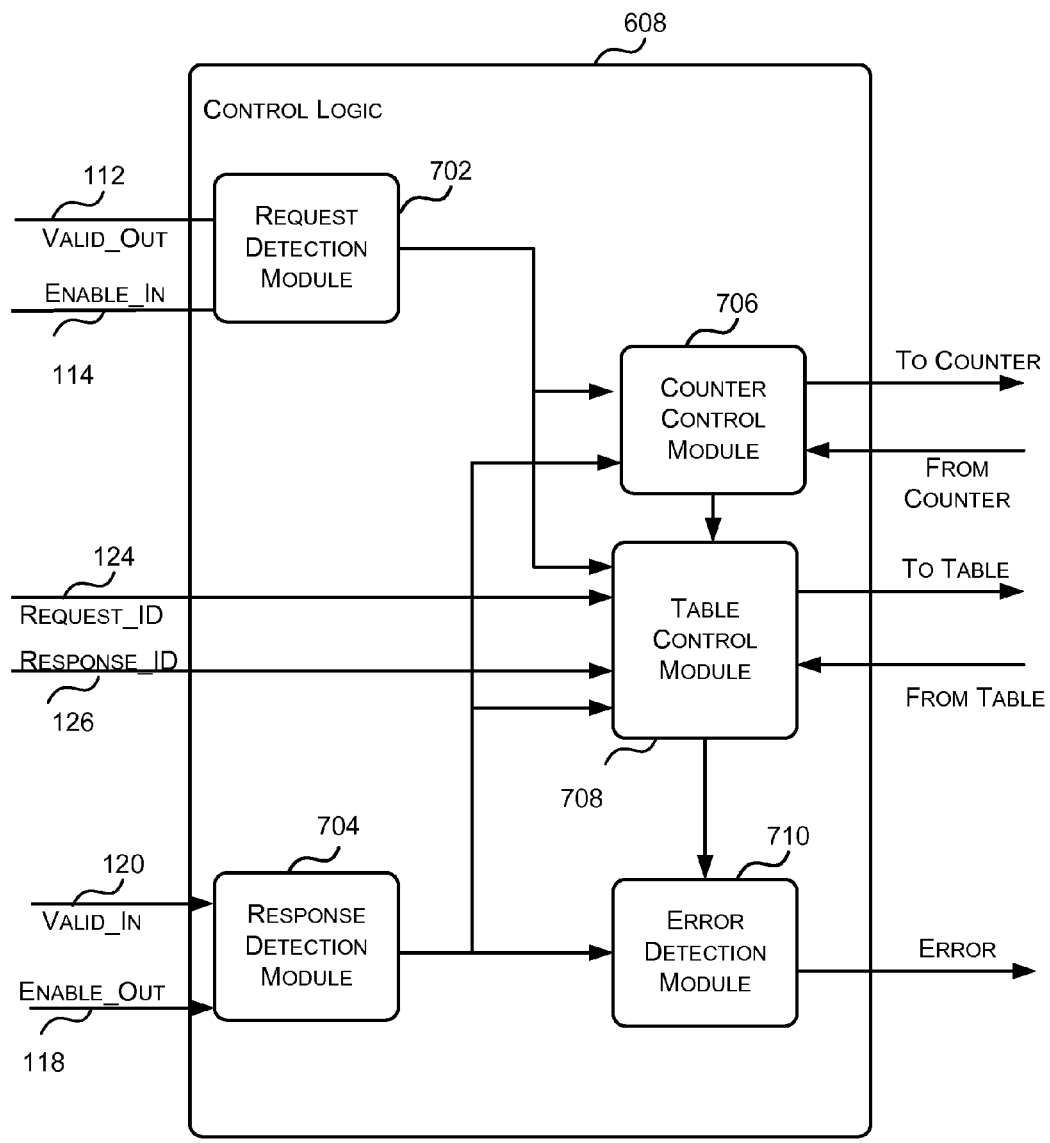
FIG. 7 is a block diagram of the control logic of the data structure of FIG. 6.

Reference is now made to FIG. 7 which illustrates an example of the control logic 608 of FIG. 6. In the example of FIG. 7, the control logic 608 comprises a request detection module 702, a response detection module 704, a counter control module 706, a table control module 708 and an error detection module 710.

The request detection module 702 is configured to detect when a transaction request has been issued by the master 106 (e.g. when there is a new in-flight transaction). In some cases, the request detection module 702 is configured to detect that a transaction request has been issued from the master 106 when the Valid_Out 112 and Enable_In 114 signals are high indicating the master 106 has a transaction request to send and the slave 108 is ready to receive the transaction request respectively. It will be evident to a person of skill in the art that this is an example only and that in other cases other methods may be used to detect when a transaction request has been issued. When the request detection module 702 determines that a transaction request has been issued it sends an indication of the detection to the counter control module 706, and the table control module 708.

Similarly, the response detection module 704 is configured to detect when a response has been issued by the slave 108. In some cases, the response detection module 704 is configured to detect that a response has been issued by the slave 108 when the Valid_In 120 and Enable_Out 118 signals are high indicating the slave 108 has response data to send and the master 106 is ready to receive the response respectively. It will be evident to a person of skill in the art that this is an example only and that in other cases other methods may be used to detect when a transaction response has been received. When the response detection module 704 determines a response has been issued it sends an indication of the detection to the counter control module 706, the table control module 708 and the error detection module 710.

The counter control module 706 is configured to access and maintain the counter 604. In particular, the counter control module 706 is configured to: (i) read from and write to the counter 604 to ensure the counter 604 has a current count of the number of in-flight transactions; and (ii) read the current value of the counter 604 and provide it to the table control module so that the table can be updated accordingly.

In some cases, upon receiving an indication from the request detection module 702 that a transaction request has been issued, the counter control module 706 may be configured to request the current value of the counter 604 and provide this to the table control module 708. In the next cycle, the counter control module 706 then increments the counter 604 to indicate there is one more transaction in-flight.

Upon receiving an indication from the response detection module 704 that a response has been issued, the counter control module 706 may be configured to request the current value of the counter 604 and in the next cycle, decrement the counter 604 to indicate there is one less transaction in-flight.

The table control module 708 is configured to access and maintain the table 606. In particular, the table control module 708 is configured to: (i) read from and write to the table 606 so that the table contains 606 information on which particular transactions are in-flight and the relative order of the in-flight transactions (e.g. the order in which they were issued); and (ii) read from the table 606 and provide the current information to the error detection module 710 so that the error detection module 710 can determine if an error occurred (e.g. a response was issued out of order).

In one example, upon receiving an indication from the request detection module 702 that a transaction request has been issued by the master 106 the table control module 706 may be configured to update the row corresponding to the Request_ID 124 to indicate (a) the transaction is in-flight; and (b) the age of the transaction with respect to the other in-flight transactions. Where the table comprises a valid bit updating the appropriate row may comprise: (a) updating the valid column of the row corresponding to the Request_ID 124 to indicate the transaction is in-flight (i.e. has been issued); and (b) taking the counter value received from the counter control module 706 and writing it to the age column of the row corresponding to the Request_ID to indicate the order of the transaction with respect to the other in-flight transactions (e.g. whether it is the fourth in-flight transaction or the first). Where the table does not comprise a valid bit updating the appropriate row may comprise taking the counter value received from the counter control module 706 and writing it to the age column of the row corresponding to the Request_ID 124 to indicate both that the transaction is in-flight and the age of the in-flight transaction with respect to the other in-flight transactions.

Upon receiving an indication from the response detection module 704 that a response has been issued, the table control module 706 may be configured to (a) update the entry/row corresponding to the Response_ID 126 to indicate the transaction is no-longer in-flight (e.g. a response has been received); and (b) update the entry for all other in-flight transactions to indicate that each remaining in-flight transaction has moved up in the order. Where the table comprises a valid bit this may comprise: (a) clearing the valid bit (e.g. setting it to zero) for the entry/row corresponding to the Response_ID 126 to indicate the transaction is no-longer in-flight; and (b) decrementing the age value for each entry with the valid bit set to indicate that each remaining in-flight transaction has moved up in the order. For example if an in-flight transaction was the $2^{nd}$ oldest in-flight transaction before the response was received, once the response is received the age value is decremented to indicate that the in-flight transaction is now the oldest in-flight transaction. Where the table does not comprise a valid bit this may comprise (a) clearing the age value (e.g. setting it to zero) for the entry corresponding to the Response_ID; and (b) decrementing the age value for each entry with a non-zero age value.

The error detection module 710 is configured to detect when a response has been issued by the slave 108 out of order when it was expected to come back in order. In one example, upon receiving an indication from the response detection module 704 that a response has been issued, the error detection module 710 analyses the table entry received from the table control module 708 corresponding to the Response_ID 126 to determine whether it indicates that the response corresponds to the oldest in-flight transaction. In some cases (e.g. where the table comprises a valid bit), the error detection module 710 may be configured to detect an error if the valid bit is not set and the age value is not zero. In other cases (e.g. where the table does not comprise a valid bit), the error detection module 710 may be configured to detect an error if the age value is not a predetermined value (e.g. one).

In some cases the verification or checking performed by the error detection module 710 is accomplished through use of an assertion. As is known to those of skill in the art an assertion is a statement about a specific property that is expected to hold for a design (e.g. is always true). In other words, an assertion is an expression that, if false, indicates an error. Within hardware description language (HDL) designs, an assertion is an executable statement that checks for specific behavior within the HDL design.

An assertion is typically written in an assertion language. Assertion languages include, but are not limited to, SystemVerilog (SV), Property Specification Language (PSL), Incisive Assertion Library (IAL), Synopsys OVA (OpenVera Assertions), Symbolic Trajectory Evaluation (STE), SystemC Verification (SVC), 0-In, Specman, and OpenVera Library (OVL).

Figure 8:
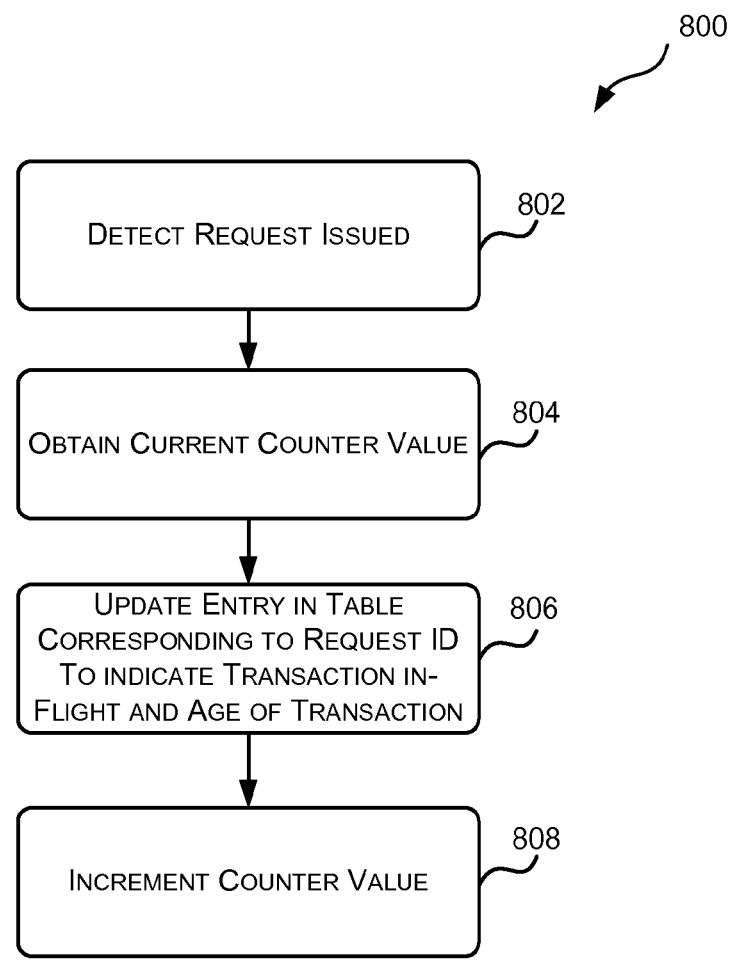
FIG. 8 is a flow chart of a method for updating the counter and table of the data structure of FIG. 6 upon detecting a transaction request has been issued.

Reference is now made to FIG. 8 which illustrates an example method 800 that may be executed by the control logic 608 when it detects that a transaction request has been issued from the master 106. The method 800 starts at block 802 where the request detection module 702 detects that a transaction request has been issued by the master 106. As described above, a transaction request may be detected as being issued when the Valid_Out 112 and Enable_In 114 signals are high. Once it has been detected that a transaction request has been issued the method 800 proceeds to block 804.

At block 804, the current value of the counter 604 is obtained (e.g. the counter control module 706 may read or otherwise obtain the value of the counter 604). As described above the counter 604 provides an indication of the number of transactions currently in-flight.

Figure 9:
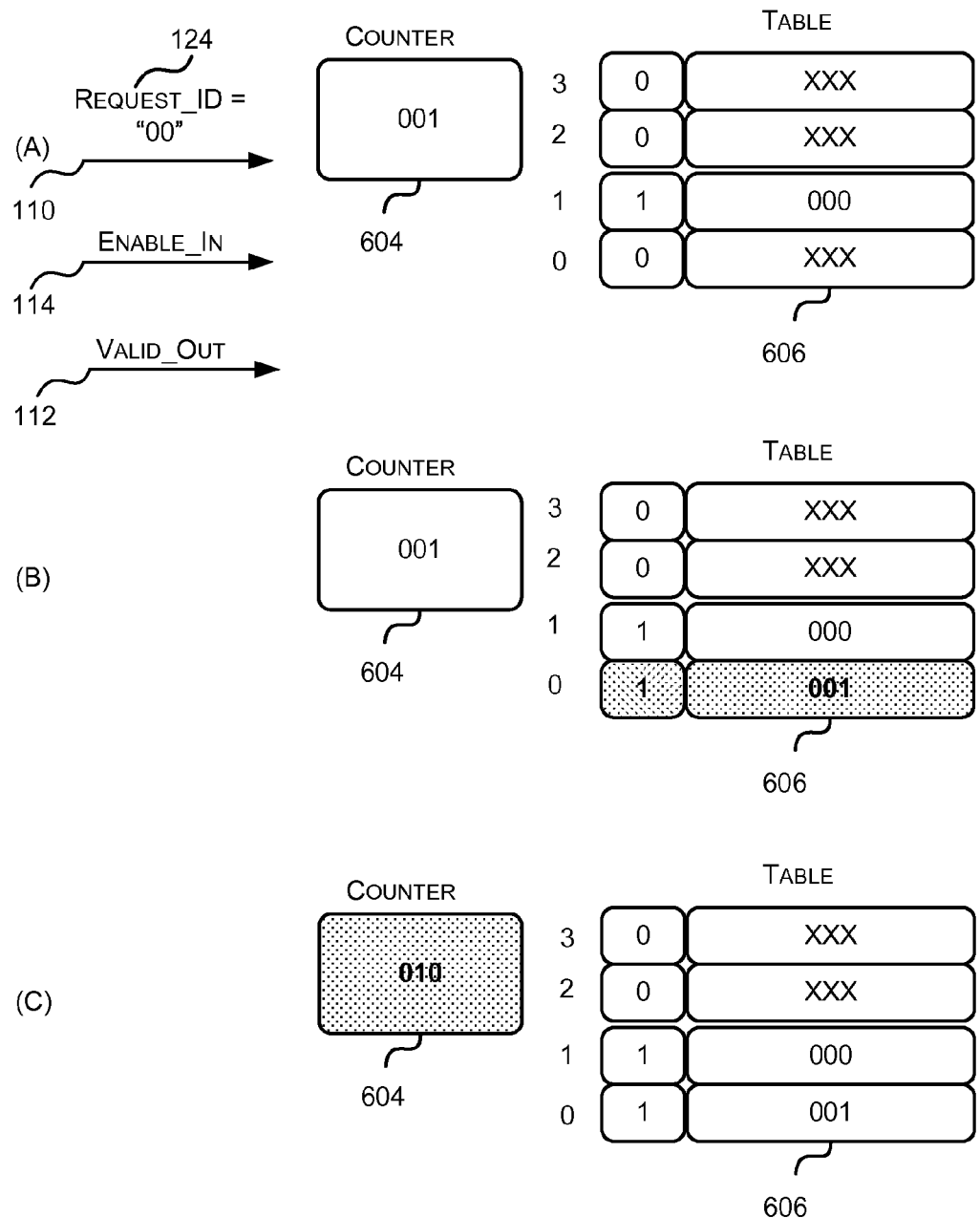
FIG. 9 is a series of block diagrams illustrating the status of the counter and table of the data structure of FIG. 6 after a transaction request has been issued.

For example, in some cases (e.g. where the table has a valid bit) a counter value of zero indicates there are no transactions in-flight and a non-zero counter value indicates the number of transactions in-flight. In particular the number of transactions in-flight is equal to the counter value. For example, a counter value of two indicates there are two transactions currently in-flight. This is illustrated in FIG. 9 where upon detecting that a transaction request has been issued (e.g. Valid_Out 112 and Enable_In 114 are high) the current value of the counter 604 is obtained. As illustrated at (A) of FIG. 9 the current value of the counter is "001" (1) indicating that there is one transaction currently in-flight. This can be seen by examining the entries in the table 606 at (A) of FIG. 9. In particular, row 1 of the table 606 of at (A) has the valid bit set indicating that a transaction with ID "01" is currently in-flight.

Figure 10:
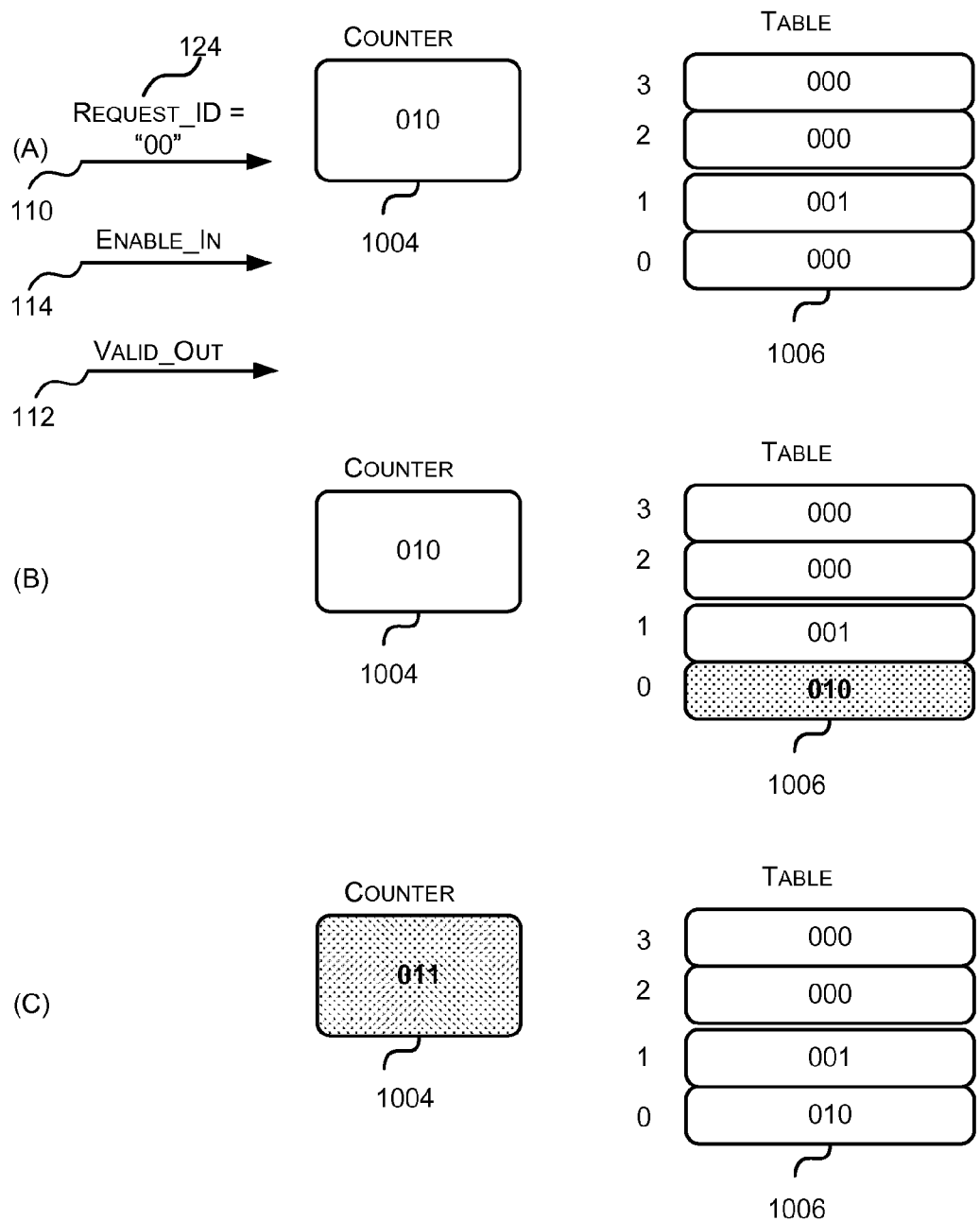
FIG. 10 is a series of block diagrams illustrating the status of an alternative counter and table after a transaction request has been issued.

In other cases (e.g. where the table does not have a valid bit) a counter value of one may indicate there are no transactions in-flight and a counter value greater than one indicates the number of transactions in-flight. In particular, the number of transactions in-flight is equal to the counter value less one. For example, a counter value of three indicates there are 3−1=2 transactions currently in-flight. This is illustrated in FIG. 10 where at (A) the counter 1004 is obtained. In particular, at (A) the current value of the counter is "010" (2) indicating that there is 2−1=1 transaction currently in-flight.

Once the current value of the counter is obtained the method 800 proceeds to block 806.

At block 806, the entry/row of the table corresponding to the transaction ID of the transaction request (e.g. Request_ID 124) is updated (e.g. by the table control module 708) to indicate that the transaction is in-flight and the order of the transaction with respect to the other in-flight transactions.

In some cases (e.g. where the table comprises a valid bit/column) updating the table comprises setting the valid column of the entry (e.g. setting it to one) to indicate that the transaction is in-flight and setting the age value to the current value of the counter 604 as obtained in block 804 to indicate the current order of the transaction with respect to the other in-flight transactions. In some cases, the lower the age value, the older the in-flight transaction (e.g. the more time has passed since the transaction request was issued) and the higher the age value, the newer the in-flight transaction (e.g. the more recently the transaction request was issued).

This is illustrated in FIG. 9 where at (A) a transaction request is issued with a Request_ID of "00" (0). This causes row 0 of the table to be updated (as shown at (B) of FIG. 9) so that the valid column is set to "1" and the age column is set to the current counter 604 value ("001" in this case). As described above, the current counter 604 value of "001" indicates that there is currently one transaction in-flight.

In other cases (e.g. where the table does not comprise a valid bit/column) updating the table comprises setting the age value to the current value of the counter 1004 as obtained in block 804 to indicate the transaction is in-flight and the current order of the transaction. In particular, in these cases a non-zero age value indicates the transaction is currently in-flight.

This is illustrated in FIG. 10 where at (A) a transaction request is issued in with a Request_ID of "00" (0). This causes, as shown at (B) FIG. 10, the age value in row 0 of the table 1006 to be set to the current counter 1004 value ("010" in this case).

Referring back to FIG. 8, once the relevant entry in the table has been updated the method 800 proceeds to block 808.

At block 808, the counter 604 is incremented (e.g. by the counter control module 706) to reflect the fact that there is now one additional transaction in-flight.

This is illustrated in FIGS. 9 (valid bit) and 10 (no valid bit). In particular, in FIG. 9 the counter 604 value is incremented from "001" (1) at (A) and (B) to "010" (2) at (C) to indicate that there are currently two transactions in-flight. In FIG. 10 the counter 1004 value is incremented from "010" (2) at (A) and (B) to "011" (3) at (C) to indicate there are currently two transactions in-flight.

Once the counter has been incremented, the method 800 ends.

Figure 11:
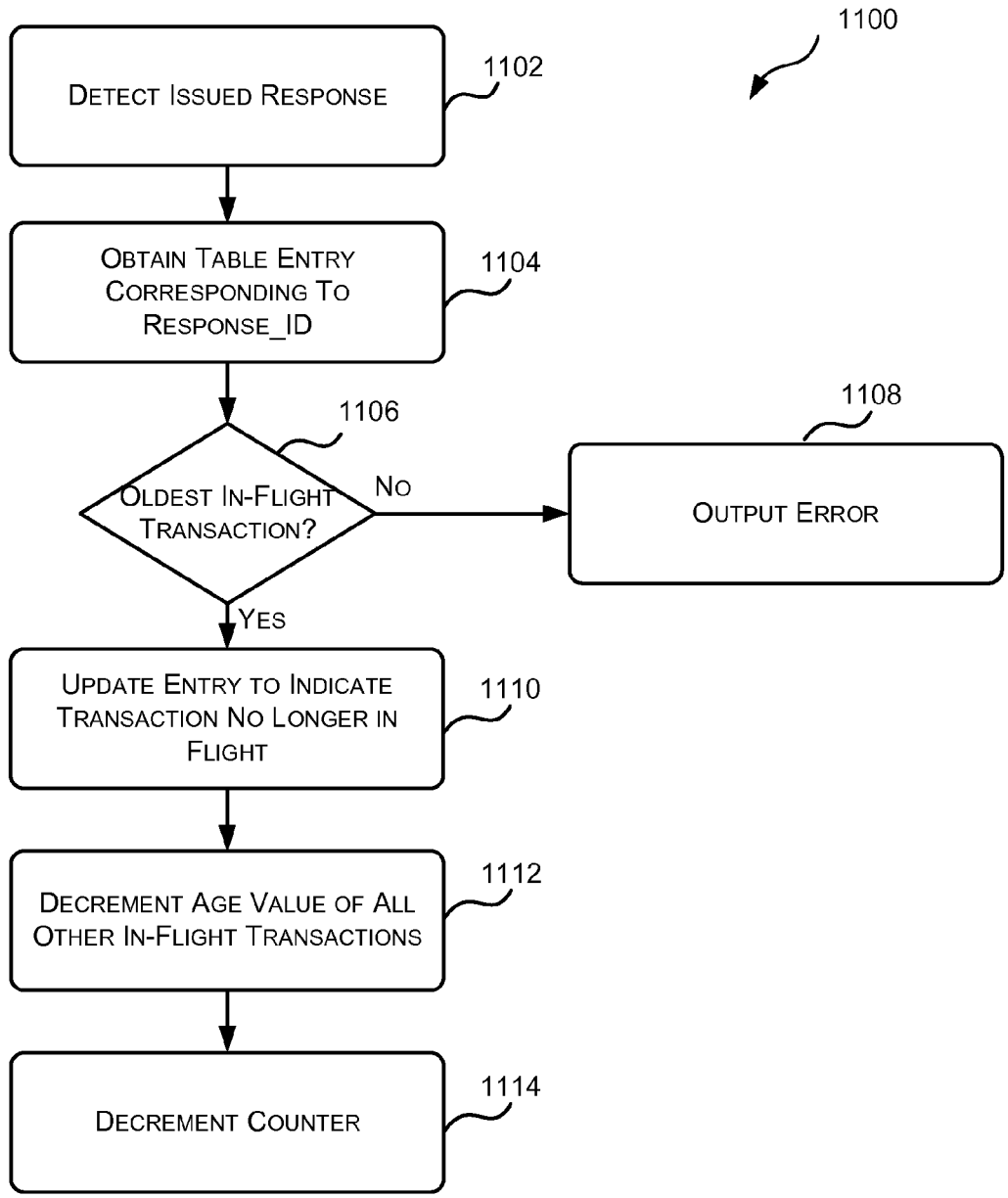
FIG. 11 is a flow chart of a method for determining whether a transaction response has been received in the correct order using the data structure of FIG. 6.

Reference is now made to FIG. 11 which illustrates an example method 1100 that may be executed by the control logic 608 when it detects a response has been issued by the slave 108. The method 1100 starts at block 1102 where the response detection module 704 detects that a transaction response has been issued by the slave 108/received by the master 106. As described above, the response detection module 704 may detect a transaction response has been issued when the Valid_In 120 and Enable_Out 118 signals are high. Once it has been detected that a transaction response has been issued the method 1100 proceeds to block 1104.

Figure 12:
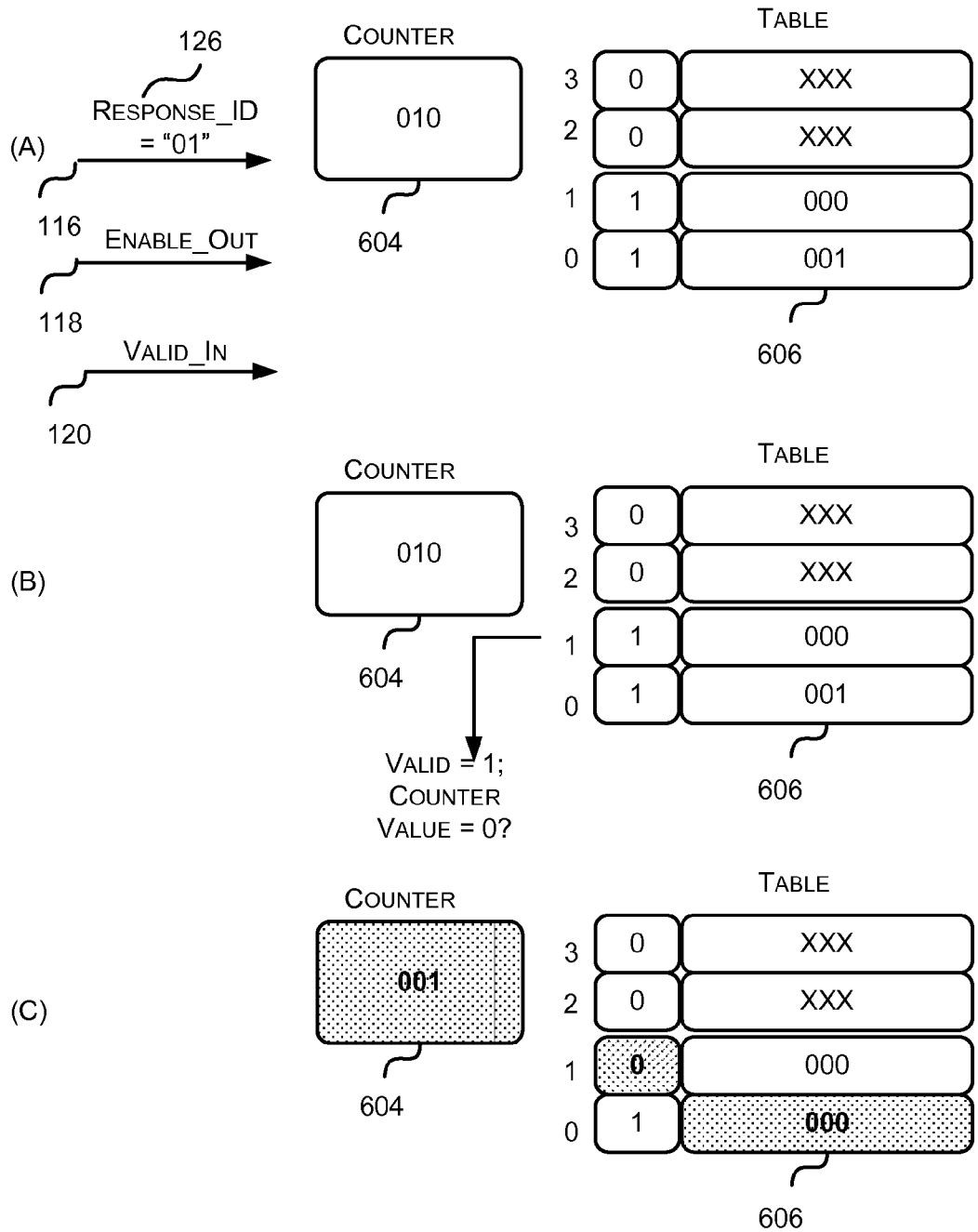
FIG. 12 is a series of block diagrams illustrating the status of the counter and table of the data structure of FIG. 6 after a transaction response has been received.

At block 1104 the table entry corresponding the transaction ID for the response (e.g. Response_ID 126) is retrieved (e.g. by the table control module). This is illustrated in FIGS. 12 (valid bit) and 13 (no valid bit). In particular, in (A) of FIG. 12 a response is issued (e.g. Valid_In 120 and Enable_Out 118 signals are high) with a Response_ID of "01" (1). This results in entry 1 of the table 606 being retrieved. In the example shown in (A) and (B) of FIG. 12, entry 1 comprises the value "1000" indicating a valid bit of 1 and an age value of "000" (0). Similarly, in (A) of FIG. 13 a response is issued with a Response_ID of "01" (1). This results in entry 1 of the table 1006 being retrieved. In the example shown in (A) and (B) of FIG. 13, entry 1 comprises the value "001" indicating the transaction is in-flight and is the first/oldest in-flight transaction. Once the appropriate table entry has been retrieved, the method 1100 proceeds to block 1106.

At block 1106 it is determined whether the response was issued by the slave in the correct order (also referred to herein as a predetermined order). It may be determined that a response came back in the correct order if the entry corresponding to the transaction ID for the response (e.g. Response_ID 126) indicates that the transaction is in-flight and is the oldest transaction in-flight. This may be determined, for example, by the error detection module 710.

In some cases (e.g. when the table comprises a valid bit), it is determined that the entry indicates that the transaction is in-flight if the valid bit (e.g. the most significant bit) is set; and it is determined that the transaction is the oldest in-flight transaction if the age value is set to a predetermined value (e.g. zero). This is illustrated in FIG. 12 where at (B) entry 1 of the table is retrieved. Entry 1 comprises the value "1000" which can be broken down into a valid bit of 1 and an age value of "000" (0) indicating the transaction is the oldest in-flight transaction.

Figure 13:
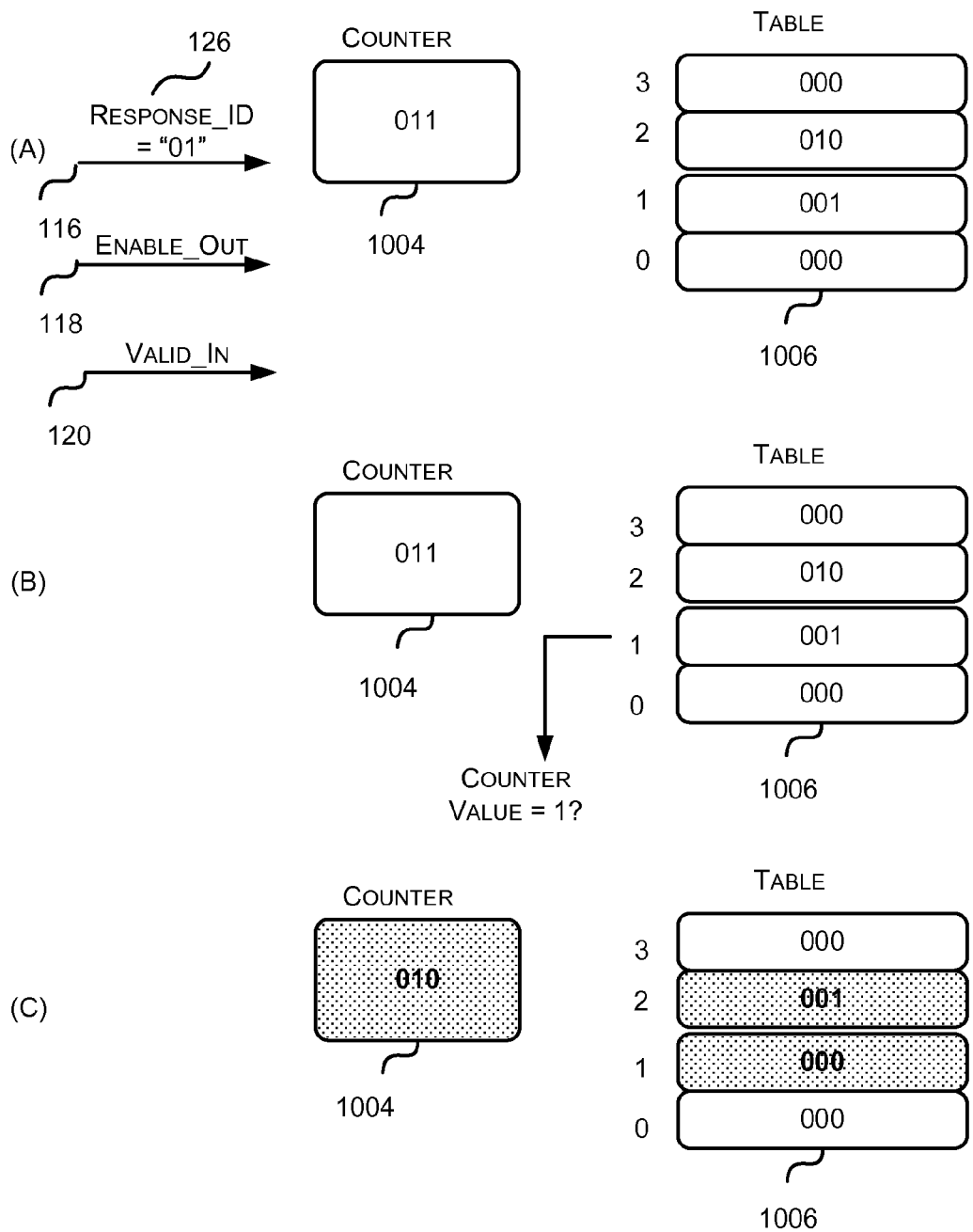
FIG. 13 is a series of block diagrams illustrating the status of an alternative counter and table after a transaction response has been received.

In other cases (e.g. where the table does not comprise a valid bit), it is determined that the entry indicates that the transaction is in-flight if the age value is greater than a first predetermined value (e.g. zero), and it is determined that the transaction is the oldest in-flight transaction if the age value is set to a second predetermined value (e.g. one). This is illustrated in FIG. 13 where at (B) entry 1 of the table is retrieved. Entry 1 comprises the value "001" (1) indicating the transaction is the oldest in-flight transaction.

If the response was issued in the correct order (e.g. the predetermined order) then the method proceeds to block 1110. Otherwise the method proceeds to block 1108 where an error is output.

At block 1110, the entry corresponding to the transaction ID for the response (Response_ID 126) is updated to indicate the transaction is no-longer in-flight.

In some cases (e.g. where the table comprises a valid bit), the valid bit for the entry corresponding to the transaction ID of the response is cleared (e.g. set to zero) to indicate that the transaction is no longer in-flight (e.g. a response has been received). This is illustrated in FIG. 12. In particular, in (A) and (B) of FIG. 12 a response is issued with a Response_ID of "01" (1). As shown in (C) of FIG. 12 this results in the valid bid for entry 1 being set to zero to indicate that the transaction with ID "01" is no longer in-flight.

In other cases (e.g. where the table does not comprise a valid bit), the age value for the entry corresponding to the transaction ID of the response (Response_ID) is set to a predetermined value (e.g. zero) to indicate that the transaction is no longer in-flight. This is illustrated in FIG. 13. In particular, in (A) of FIG. 13 a response is received with ID "01" (1). As shown in (C) of FIG. 13 this results in the age value for entry 1 being set to zero to indicate that the transaction with ID "01" is no longer in-flight.

Once the entry corresponding to the transaction ID for the response (Response_ID) is updated the method 1100 proceeds to block 1112.

At block 1112, the age value for each remaining in-flight transaction is decremented to reflect the fact that each of the in-flight transactions has now moved up the order list. For example, a transaction that was the second oldest in-flight transaction now becomes the oldest in-flight transaction.

A first example is shown in FIG. 12. In particular, in (A) of FIG. 12 a response is issued with a Response_ID of "01" (1). As shown in (C) of FIG. 12 this results in the age value for entry 0 being decremented from "001" in (A) and (B) of FIG. 12 to "000" in (C) of FIG. 12 to indicate that the transaction with ID "00" (0) is now the oldest in-flight transaction.

A second example is shown in FIG. 13. In particular, in (A) of FIG. 13 a response is issued with a Response_ID of "01". As shown in (C) of FIG. 13 this results in the age value for entry 2 being decremented from "010" in (A) and (B) of FIG. 13 to "001" in (C) of FIG. 13 to indicate that the transaction with ID "10" (1) is now the oldest in-flight transaction.

Once the age values for the remaining in-flight transactions have been updated, the method 1100 proceeds to block 1114.

At block 1114 the counter 604 is decremented to indicate that there is now one less transaction in-flight (since a response has been issued). A first example is illustrated in FIG. 12. In particular, in (A) of FIG. 12 a response is received which, as shown in (C) FIG. 12, causes the counter 604 to be decremented from "010" (2) to "001" (1). A second example is illustrated in FIG. 13. In particular, in (A) of FIG. 13 a response is received, which, as shown in (C) of FIG. 13, causes the counter 1004 to be decremented from "011" (3) to "010" (2).

Figure 14:
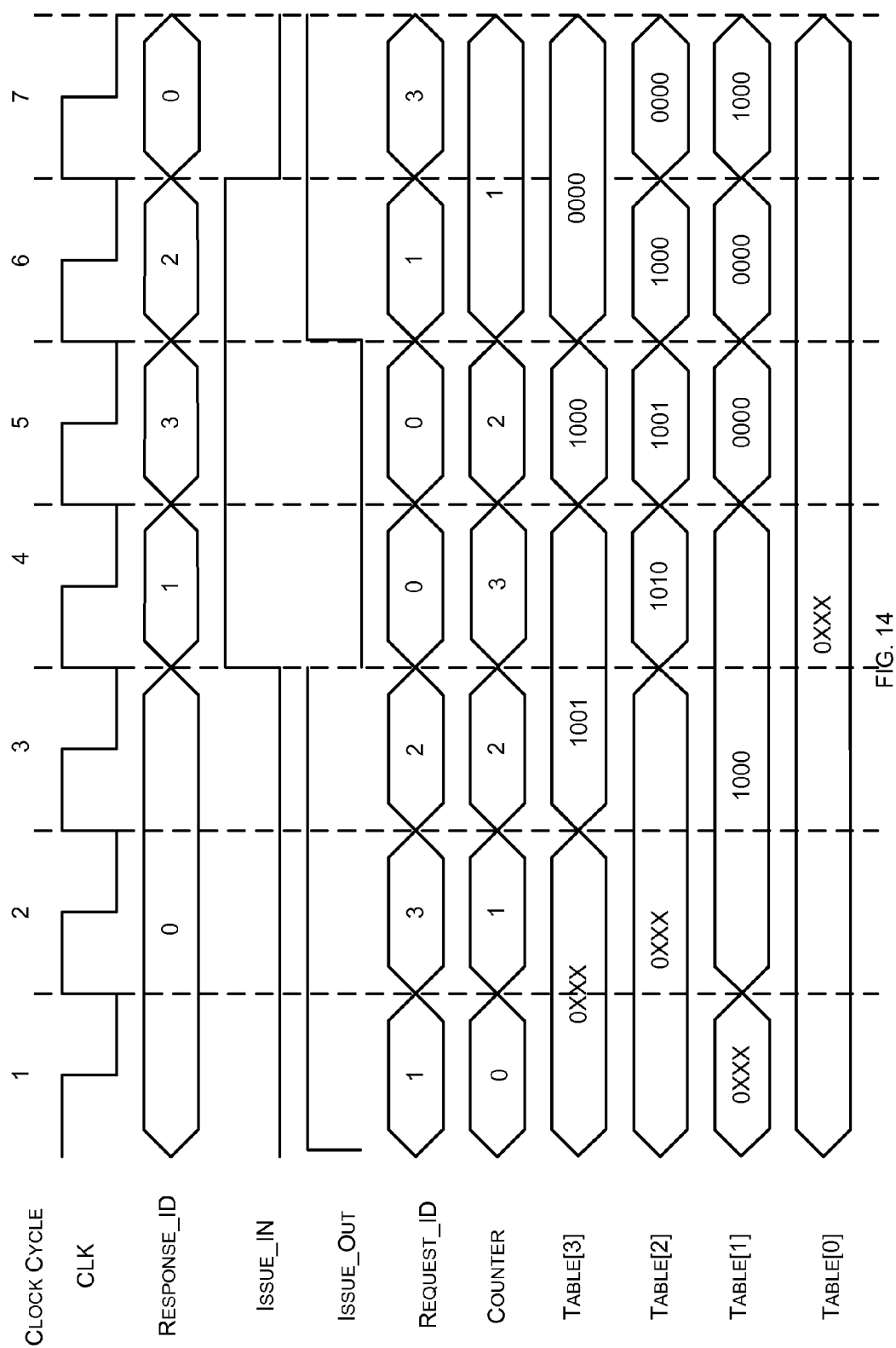
FIG. 14 is a timing diagram illustrating an example of the signals and data elements of the data structure of FIG. 6 over a period of time.

It will be evident to a person of skill in the art that one or more of the blocks of method 1100 may occur in the same cycle and one or more of the blocks may occur in different clocks cycles. In one example, blocks 1102, 1104 are completed in a first clock cycle (e.g. the clock cycle in which the response is received) and blocks 1106, 1108, 1110, 1112 and 1114 are completed in a second clock cycle (e.g. the clock cycle after the clock cycle in which the response is received). However, in other examples, the blocks may be executed in other combinations of clock cycles Reference is now made to FIG. 14 which illustrates an example timing diagram of the signals and elements (counter 604 and table 606) of the data structure 602 of FIG. 6. The timing diagram shows the status of the signals and elements for seven clock cycles numbered 1 to 7. The Issue_In signal is used to indicate that a transaction response has been issued by the slave/received by the master; the Issue_Out signal is used to indicate that a transaction request has been issued by the master; and Table[N] is used to indicate the $n^{th}$ row of the Table.

In the first clock cycle the counter has been initialized to zero to indicate there are no transactions in-flight, and each valid bit in the table has been initialized to zero to indicate a transaction with the corresponding ID is not in-flight as shown in Table 1. The age values in the table have not been initialized to any known value and so they may have any value (this is denoted by an "X"). In the first clock cycle a transaction request is issued with ID 1.

TABLE 1

COUNTER 0

| Table Index | Table - Valid Column | Table - Age Column |
|---|---|---|
| 0 | 0 | XXX |
| 1 | 0 | XXX |
| 2 | 0 | XXX |
| 3 | 0 | XXX |

In the second clock cycle, the counter is incremented to 1 to indicate that there is now one transaction in-flight (ID 1); entry 1 in the table is updated to set the valid bit and set the age value to 0 as shown in Table 2 to indicate that a transaction with ID 1 is in-flight and is the oldest in-flight transaction. Also in the second clock cycle a transaction request is issued with ID 3.

TABLE 2

COUNTER 1

| Table Index | Table - Valid Column | Table - Age Column |
|---|---|---|
| 0 | 0 | XXX |
| 1 | 1 | 000 |
| 2 | 0 | XXX |
| 3 | 0 | XXX |

In the third clock cycle, the counter is incremented to 2 to indicate that there are now two transactions in-flight (ID 1, ID 3); entry 3 in the table is updated to set the valid bit and set the age value to 1 as shown in Table 3 to indicate that a transaction with ID 3 is in-flight and is the second oldest in-flight transaction. Also in the third clock cycle a transaction request is issued with ID 2.

TABLE 3

COUNTER 2

| Table Index | Table - Valid Column | Table - Age Column |
|---|---|---|
| 0 | 0 | XXX |
| 1 | 1 | 000 |
| 2 | 0 | XXX |
| 3 | 1 | 001 |

In the fourth clock cycle, the counter is incremented to 3 to indicate that there are now three transactions in-flight (ID 1, ID 3, ID 2); entry 2 in the table is updated to set the valid bit and set the age value to 2 as shown in Table 4 to indicate that a transaction with ID 2 is in-flight and is the third oldest in-flight transaction. Also, in the fourth clock cycle a transaction response is issued with ID 1.

TABLE 4

COUNTER 3

| Table Index | Table - Valid Column | Table - Age Column |
|---|---|---|
| 0 | 0 | XXX |
| 1 | 1 | 000 |
| 2 | 1 | 010 |
| 3 | 1 | 001 |

In the fifth clock cycle, the counter is decremented to 2 to indicate that there are now only two transactions in-flight (ID 3, ID 2); entry 1 in the table is updated to set the valid bit to 0 to indicate the transaction with ID 1 is no longer in-flight (a response has been issued); entry 2 is updated to decrement the age value to 1 to indicate that the transaction with ID 2 is the second oldest transaction in-flight; entry 3 is updated to decrement the age value to 0 to indicate that the transaction with ID 3 is the oldest transaction in-flight as shown in Table 5. Also in the fifth click cycle a transaction response is issued with ID 3.

TABLE 5

COUNTER 2

| Table Index | Table - Valid Column | Table - Age Column |
|---|---|---|
| 0 | 0 | XXX |
| 1 | 0 | 000 |
| 2 | 1 | 001 |
| 3 | 1 | 000 |

In the sixth clock cycle, the counter is decremented to 1 to indicate that there is only one transaction in-flight (ID 2); entry 3 in the table is updated to set the valid bit to 0 to indicate the transaction with ID 3 is no longer in-flight (a response has been issued); entry 2 in the table is updated to decrement the age value to 0 to indicate that the transaction with ID 2 is the oldest transaction in-flight as shown in Table 6. Also in the sixth clock cycle a transaction response is received with ID 2 and a transaction request is issued with ID 1.

TABLE 6

COUNTER 1

| Table Index | Table - Valid Column | Table - Age Column |
|---|---|---|
| 0 | 0 | XXX |
| 1 | 0 | 000 |
| 2 | 1 | 000 |
| 3 | 0 | 000 |

In the seventh clock cycle, the counter is decremented and incremented since both a request was issued and a response received resulting in no change to the counter; entry 2 in the table is updated to set the valid bit to 0 to indicate the transaction with ID 2 is no longer in-flight (a response has been issued); entry 1 is updated to set the valid bit to 1 and the age value to zero to indicate that a transaction with ID 1 is in-flight and is the oldest in-flight transaction as shown in Table 7.

TABLE 7

COUNTER 1

| Table Index | Table - Valid Column | Table - Age Column |
|---|---|---|
| 0 | 0 | XXX |
| 1 | 1 | 000 |
| 2 | 0 | 000 |
| 3 | 0 | 000 |

Figure 15:
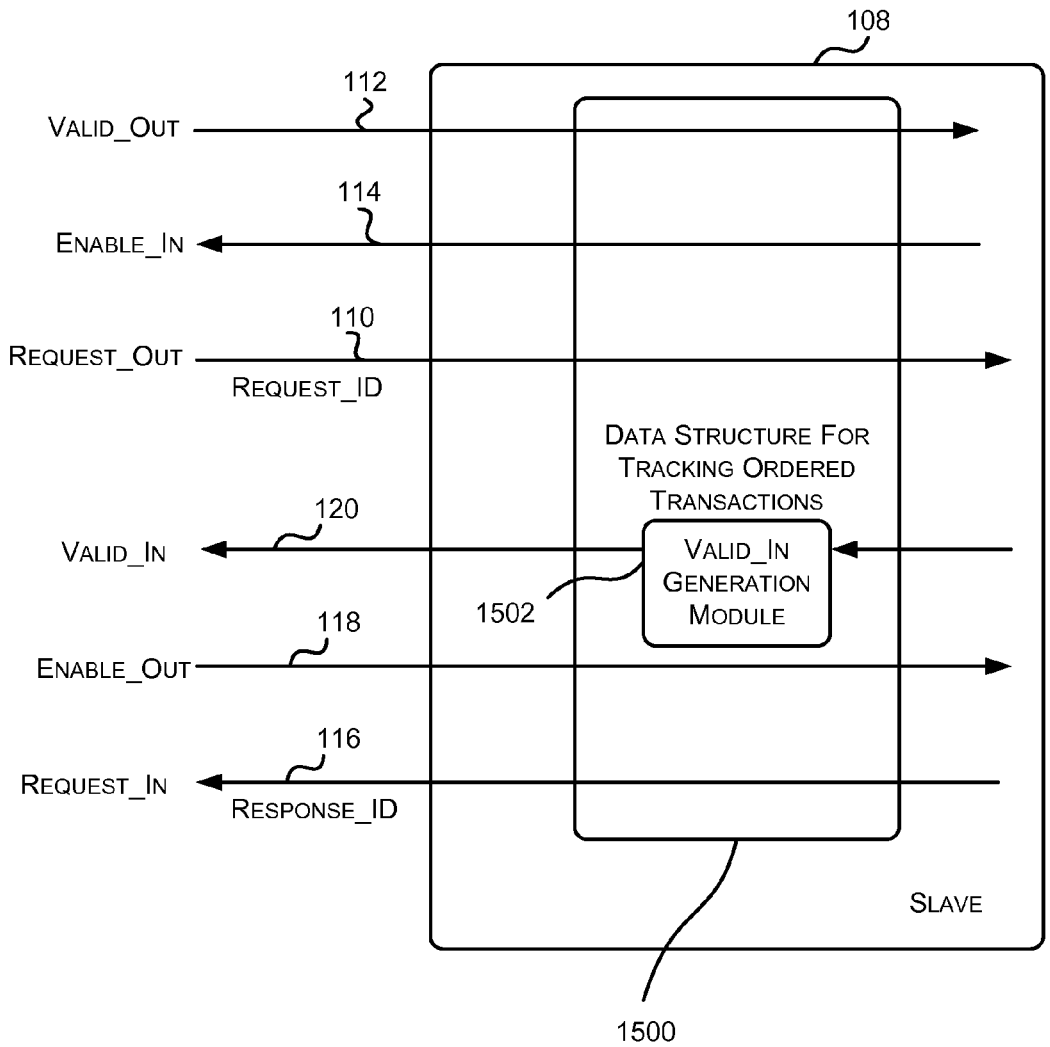
FIG. 15 is an example of the slave of FIG. 1.

The hardware data structures described above have been described as being using for checking or verifying that transaction responses are issued in the same order in which the corresponding transaction requests were issued. However, the hardware data structures described above may also be used to enforce ordering. In these cases the hardware data structure becomes part of the slave (for example) and is implemented in silicon. This is illustrated in FIG. 15 where the slave 108 comprises a data structure 1500 for tracking and enforcing ordering of transactions. The data structure 1500 of FIG. 15 is the same as the data structure 602 described above, except it has an additional component, a valid_in generation module 1502 which is responsible for controlling the valid_in signal. In general the valid_in generation module ensures that the valid_in signal is kept low if a response has come back out of order or if a response has come back without a corresponding request having been made. This ensures that a response is not issued out of order.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A hardware data structure configured to track a plurality of ordered transactions in a multi-transactional hardware design, the hardware data structure comprising:
   a counter configured to store a value that tracks a number of in-flight transactions in the hardware design;

a table configured to track an age of each of the in-flight transactions using the counter; and control logic configured to verify that a transaction response issued by the hardware design has been issued in a predetermined order based on the tracked ages of the in-flight transactions in the table.

2. The hardware data structure of claim 1, wherein verifying that the transaction response has been issued in the predetermined order comprises verifying that the transaction response corresponds to the oldest in-flight transaction based on the tracked ages of the in-flight transactions in the table.

3. The hardware data structure of claim 1, wherein the table comprises an entry for each transaction of the plurality of ordered transactions, each entry comprising information indicating the age of the transaction when the transaction is an in-flight transaction.

4. The hardware data structure of claim 3, wherein each entry further comprises information indicating whether the transaction is currently in-flight.

5. The hardware data structure of claim 4, wherein the control logic comprises a request detection module configured to detect when a new transaction is in-flight by monitoring one or more control signals of an interface of the hardware design.

6. The hardware data structure of claim 5, wherein the control logic further comprises a counter control module, the counter control module configured, in response to the request detection module detecting that a new transaction is in-flight, to increment the counter value.

7. The hardware data structure of claim 5, wherein the control logic further comprises a table control module configured, in response to the request detection module detecting that a new transaction is in-flight, to update the entry of the table corresponding to the new in-flight transaction so that the information indicating the age of the new in-flight transaction is set to the counter value.

8. The hardware data structure of claim 7, wherein the table control module is further configured, in response to the request detection module detecting that a new transaction is in-flight, to update the entry of the table corresponding to the new in-flight transaction so that the information indicating whether the transaction is in-flight indicates the transaction is in-flight.

9. The hardware data structure of claim 4, wherein the control logic comprises a response detection module configured to detect when a transaction response has been issued by monitoring one or more control signals of an interface of the hardware design.

10. The hardware data structure of claim 9, wherein the control logic further comprises a counter control module configured, in response to the response detection module detecting that a transaction response has been issued, to decrement the counter value.

11. The hardware data structure of claim 9, wherein the control logic further comprises a table control module configured, in response to the response detection module detecting that a transaction response has been issued, to update the entry of the table corresponding to the transaction response so that the information indicating whether the transaction is in-flight indicates the transaction is not in-flight.

12. The hardware data structure of claim 11, wherein the table control module is further configured, in response to the response detection module detecting that a transaction response has been issued, to decrement the information indicating the age of the transaction in the table for each in-flight transaction.

13. The hardware data structure of claim 9, wherein the control logic further comprises an error detection module configured, in response to the response detection module detecting that a transaction response has been issued, to verify that the transaction response has been issued in the predetermined order based on the information indicating the age of the transaction of the entry of the table corresponding to the transaction response.

14. The hardware data structure of claim 13, wherein the error detection module is configured to verify that the transaction response has been issued in the predetermined order using one or more assertions written in an assertion-based language.

15. The hardware data structure of claim 14, wherein the error detection module verifies that the transaction response has been issued in the predetermined order by evaluating the one or more assertions for one or more states of the hardware design.

16. The hardware data structure of claim 14, wherein the error detection module verifies that the transaction response has been issued in the predetermined order by evaluating the one or more assertions as input stimuli are applied to the hardware design.

17. The hardware data structure of claim 14, wherein the error detection module is configured to verify that the transaction response has been issued in the predetermined order using one or more assertions under one or more fairness constraints.

18. The hardware data structure of claim 3, wherein each transaction comprises a transaction ID and the entry of the table corresponding to a particular transaction is identified by the transaction ID.

19. A method of tracking a plurality of ordered transactions in a multi-transactional hardware design, the method comprising:
tracking a number of in-flight transactions in the hardware design using a counter;
tracking an age of each of the in-flight transactions in a table using the counter; and
verifying that a transaction response issued by the hardware design has been issued in a predetermined order based on the tracked ages of the in-flight transactions in the table.

20. A non-transitory computer readable storage medium having stored thereon computer executable instructions that when executed cause at least one processor to:
track a number of in-flight transactions in a multi-transactional hardware design using a counter;
track an age of each of the in-flight transactions in a table using the counter; and
verify that a transaction response issued by the multi-transactional hardware design has been issued in a predetermined order based on the tracked ages of the in-flight transactions in the table.

* * * * *